United States Patent
Chen et al.

(10) Patent No.: US 10,723,634 B1
(45) Date of Patent: Jul. 28, 2020

(54) SYSTEMS AND METHODS FOR GAS TRANSPORT DESALINATION

(71) Applicant: Mina Sagar, New York, NY (US)

(72) Inventors: Kuo-mei Chen, Kaohsiung (TW); Sanjay Sagar, New York, NY (US); Hsin D. Chen, New York, NY (US)

(73) Assignee: Mina Sagar, New York, NY (US)

( * ) Notice: Subject to any disclaimer, the term of this patent is extended or adjusted under 35 U.S.C. 154(b) by 0 days.

(21) Appl. No.: 16/286,578

(22) Filed: Feb. 26, 2019

(51) Int. Cl.
| | |
|---|---|
| *C02F 1/14* | (2006.01) |
| *C02F 1/26* | (2006.01) |
| *C02F 1/04* | (2006.01) |
| *C02F 1/18* | (2006.01) |
| *C02F 103/08* | (2006.01) |
| *B01D 5/00* | (2006.01) |
| *C02F 103/06* | (2006.01) |

(52) U.S. Cl.
CPC ............ *C02F 1/265* (2013.01); *C02F 1/043* (2013.01); *C02F 1/14* (2013.01); *B01D 5/006* (2013.01); *C02F 1/18* (2013.01); *C02F 2103/06* (2013.01); *C02F 2103/08* (2013.01); *C02F 2201/002* (2013.01)

(58) Field of Classification Search
CPC . C02F 1/043; C02F 1/14; B01D 3/343; B01D 5/006
See application file for complete search history.

(56) References Cited

U.S. PATENT DOCUMENTS

| | | | | |
|---|---|---|---|---|
| 3,345,272 | A * | 10/1967 | Collins | ............... C02F 1/10 203/11 |
| 4,036,749 | A | 7/1977 | Anderson | |
| 4,664,752 | A * | 5/1987 | Zievers | ............... C02F 1/043 203/10 |
| 4,747,951 | A | 5/1988 | Ellis | |
| 4,877,536 | A | 10/1989 | Bertness et al. | |
| 6,365,005 | B1 * | 4/2002 | Schleiffarth | ......... B01D 1/2818 159/24.1 |
| 6,607,639 | B1 * | 8/2003 | Longer | ............... B01D 1/0047 203/10 |
| 6,919,000 | B2 * | 7/2005 | Klausner | ............... C02F 1/04 203/10 |
| 8,292,272 | B2 * | 10/2012 | Elsharqawy | ............ C02F 1/048 261/117 |

(Continued)

*Primary Examiner* — Jonathan Miller
(74) *Attorney, Agent, or Firm* — Kanika Radhakrishnan; Evergreen Valley Law Group (57) ABSTRACT

The present disclosure provides a system for extracting potable water from saline water. The system includes a pre-treatment unit configured to receive the saline water from a reservoir, and configured to heat the saline water to a predetermined temperature. An evaporator is coupled to the pre-treatment unit for receiving the heated saline water, and includes a housing for receiving the heated saline water, a porous material disposed in the housing and an evaporator gas port. The evaporator gas port routes gas into the housing via the porous material, and disperses to form gas bubbles. The gas bubbles induce turbulent motion within the housing for converting the heated saline water into the mixture of the water vapors and the concentrated saline water. Further, a condenser is coupled to the housing for receiving the mixture of the gas and the water vapors, and configured to condense water vapors to form potable water.

17 Claims, 7 Drawing Sheets

(56) References Cited

U.S. PATENT DOCUMENTS

| | | | |
|---|---|---|---|
| 8,459,359 B2 | 6/2013 | Vinegar | |
| 9,486,844 B2 | 11/2016 | Guo et al. | |
| 9,834,454 B2 * | 12/2017 | Frolov | B01D 1/0047 |
| 9,834,455 B2 * | 12/2017 | Frolov | B01D 1/0047 |
| 2012/0108426 A1 | 5/2012 | Gong et al. | |
| 2013/0118887 A1 * | 5/2013 | Frolov | B01D 1/0047 |
| | | | 202/185.1 |

* cited by examiner

SYSTEMS AND METHODS FOR GAS TRANSPORT DESALINATION

TECHNICAL FIELD

The present disclosure relates generally to systems and methods for treating saline water and, more particularly to, systems and methods for extracting potable water from the saline water.

BACKGROUND

In recent past, scarcity of fresh water has turned out to be a global issue, which may be due to excessive usage of the fresh water by the population or contamination of the clean water due to industry effluents, oil and gas rigs and the like. For conserving the fresh water, the existing technologies are capitalized for extracting potable water from saline water such as, but not limited to, seawater, waste water, contaminated water and the like.

The existing techniques for potable water extraction may be broadly categorized as distillation (or thermal desalination process) and membrane separation processes. The most efficient and most utilized of these techniques are multistage flash distillation (MSF), multiple effect evaporation (MEE), mechanical vapor recompression (MVR) and reverse osmosis (RO). However, costs i.e. energy costs and the capital cost are a major driving factor for all of these processes, which makes it inaccessible. Additionally, for an MSF plant, co-generated steam from an electric power generation facility is required as an energy input for heating the saline water to 110° C., which makes this process cumbersome and energy inefficient. Moreover, for an RO plant, the mechanical power for driving the saline water through an array of thousands of RO tubes in an RO desalination plant requires a tremendous amount of energy, which is undesirable. Further, in the desalination plant, issues of seawater pre-treatment by filtration, bio-fouling, scaling of mineral salts, corrosion of metallic parts, components, and valves by the chloride ions translate into premature failure of the components of the plant. This factor inherently requires frequent replacement of the components in the plant, rendering the maintenance of the plant to be tedious and cumbersome, which is undesirable.

Furthermore, a vacuum environment is indispensable for all the thermal desalination technologies. Either a steam ejector or a turbo compressor is typically employed to drive a unidirectional mass flow of water molecules to the condenser. The evaporation rate of liquid water from a falling film or water droplets from a spray nozzle inside an evaporator can only be optimized under a good vacuum. Boiling of saline water under a reduced pressure is the rule of thumb. Consequently, additional Roots and oil-free screw vacuum pumps should be installed to pump out non-condensable gases (air molecules) which are released continuously from saline water under reduced pressure, which is uneconomical.

Therefore, there is a need for techniques which can overcome one or more limitations stated above in addition to providing other technical advantages.

SUMMARY

Various embodiments of the present disclosure provide a system for extracting potable water from saline water. The system includes a pre-treatment unit configured to receive the saline water from a reservoir. The pre-treatment unit is configured to heat the saline water to a predetermined temperature. An evaporator is fluidically coupled to the pre-treatment unit for receiving the heated saline water. The evaporator includes a housing fluidically coupled to the pre-treatment unit for receiving the heated saline water, a porous material disposed at a bottom portion of the housing and an evaporator gas port. The evaporator gas port is mounted to the housing and positioned below the porous material. The evaporator gas port routes gas into the housing via the porous material, wherein the gas upon routing through the porous material disperses within the housing to form gas bubbles. The gas bubbles induce turbulent motion of the heated saline water within the housing for converting the heated saline water into the mixture of the water molecules and the concentrated saline water. Further, a condenser is fluidically coupled to the housing for receiving the mixture of the gas and the water molecules. The condenser is configured to condense the water molecules to form potable water, thereby extracting potable water from the saline water.

In an embodiment, the present disclosure also provides an evaporator. The evaporator includes the housing configured for receiving heated saline water, the heated saline water being heated to the predetermined temperature. The porous material is disposed at the bottom portion of the housing and the evaporator gas port is mounted to the housing and positioned below the porous material. The gas port routes gas into the housing through the porous material, wherein the gas upon routing through the porous material disperses within the housing to form gas bubbles. The gas bubbles induce turbulent motion of the heated saline water within the housing for converting the heated saline water into the mixture of the water molecules and the concentrated saline water.

In an embodiment, the present disclosure also provides a method for extracting potable water from saline water. The method including, heating, by the pre-treatment unit, the saline water received from the reservoir to a predetermined temperature. The heated saline water is then routed to the evaporator coupled to the pre-treatment unit. The gas is subsequently routed into the evaporator through the porous material disposed within the evaporator, wherein the gas upon routing through the porous material disperses within the evaporator to form gas bubbles. The gas bubbles induce turbulent motion of the heated saline water within the housing for converting the heated saline water into the mixture of the water molecules and the concentrated saline water. Further, the gas and the water molecules are routed to the condenser fluidly coupled to the housing. The condenser condensing the water molecules to form potable water, thereby extracting potable water from the saline water.

In one embodiment of the present disclosure, air bubbles are generated by flowing air through a porous disk in the bottom of the evaporator. A single blower between the evaporator and the condenser drives the air flow and transports gas mixtures. Water evaporation is enhanced by the large interfacial areas of air bubbles and a turbulent mixing between phase boundaries of saline feed water and air molecules. The combined effects of enhanced evaporation of seawater or saline water at a relatively low temperature and a high flux of vaporized water molecules lead to an efficient preparation of clean water with an optimized energy economy.

BRIEF DESCRIPTION OF THE FIGURES

The following detailed description of illustrative embodiments is better understood when read in conjunction with the appended drawings. For the purpose of illustrating the present disclosure, exemplary constructions of the disclosure are shown in the drawings. However, the present disclosure is not limited to a specific device or a tool and instrumentalities disclosed herein. Moreover, those in the art will understand that the drawings are not to scale. Wherever possible, like elements have been indicated by identical numbers.

The drawings referred to in this description are not to be understood as being drawn to scale except if specifically noted, and such drawings are only exemplary in nature.

DETAILED DESCRIPTION

In the following description, for purposes of explanation, numerous specific details are set forth in order to provide a thorough understanding of the present disclosure. It will be apparent, however, to one skilled in the art that the present disclosure can be practiced without these specific details. Descriptions of well-known components and processing techniques are omitted so as to not unnecessarily obscure the embodiments herein. The examples used herein are intended merely to facilitate an understanding of ways in which the embodiments herein may be practiced and to further enable those of skill in the art to practice the embodiments herein. Accordingly, the examples should not be construed as limiting the scope of the embodiments herein.

Reference in this specification to "one embodiment" or "an embodiment" means that a particular feature, structure, or characteristic described in connection with the embodiment is included in at least one embodiment of the present disclosure. The appearance of the phrase "in an embodiment" in various places in the specification are not necessarily all referring to the same embodiment, nor are separate or alternative embodiments mutually exclusive of other embodiments. Moreover, various features are described which may be exhibited by some embodiments and not by others. Similarly, various requirements are described which may be requirements for some embodiments but not for other embodiments.

Moreover, although the following description contains many specifics for the purposes of illustration, anyone skilled in the art will appreciate that many variations and/or alterations to said details are within the scope of the present disclosure. Similarly, although many of the features of the present disclosure are described in terms of each other, or in conjunction with each other, one skilled in the art will appreciate that many of these features can be provided independently of other features. Accordingly, this description of the present disclosure is set forth without any loss of generality to, and without imposing limitations upon, the present disclosure.

Overview

Various embodiments of the present disclosure provide a system and a method for extracting potable water from saline water, such as but not limited to seawater, contaminated water, wastewater and the like. The system may be configured to be used as a small to medium scale desalination device, which prevents underground water contamination, while being cost-effective in operation and maintenance.

The system includes a pre-treatment unit fluidically coupled to a reservoir, for receiving the saline water. The pre-treatment unit is configured to heat the saline water to a predetermined temperature e.g. ranging from about 70° C. to about 100° C. An evaporator is fluidically coupled with the pre-treatment unit for receiving the heated saline water and is configured to convert the saline water into a mixture of water molecules and the concentrated saline water. The evaporator includes a housing, which receives the saline water. A porous material is disposed on a bottom portion of the housing, and is a perforated sheet-like structure or a disk like structure which extends along the periphery of the housing. An evaporator gas port is mounted on the housing and is positioned below the porous material. The evaporator gas port routes gas, such as atmospheric air or any other gas as per requirement, into the housing through the porous material. The gas upon routing through the porous material disperses within the housing to form gas bubbles. These gas bubbles induce turbulent motion of the heated saline water within the housing. The turbulent motion agitates the heated saline water and consequently converts the saline water into a mixture of the water molecules and the concentrated saline water. Due to difference in the densities of the components in the mixture of the water molecules and the concentrated saline water, the concentrated saline water settles down, while the water molecules and the gas supplied to the housing settle over an upper layer of the concentrated saline water. A first evaporator outlet port is provided for discharging the concentrated saline water, while a second evaporator outlet port is provided at a top portion of the housing, for discharging the gas and the water molecules. A blower routes the gas and the water molecules to a condenser, which is fluidically coupled to the evaporator. The condenser condenses the water molecules to form the potable water. The condenser may include a heat exchanger including heat exchange tubes, whose first end is disposed within the condenser while the other end is disposed within the pre-treatment unit, for condensing the water molecules entering the condenser. The heat exchange tubes may receive a portion of the saline water from the pre-treatment unit, which is routed to the condenser for extracting the heat from the water molecules. The extracted heat is thereafter dumped in the pre-treatment unit, which aids in heating the saline water in the pre-treatment unit. The potable water settles within the condenser, which is collected via a second condenser outlet port for use.

Various embodiments of a system for extracting potable water from saline water are explained below in a detailed manner, herein with reference to FIG. 1 to FIG. 7.

Figure 1:
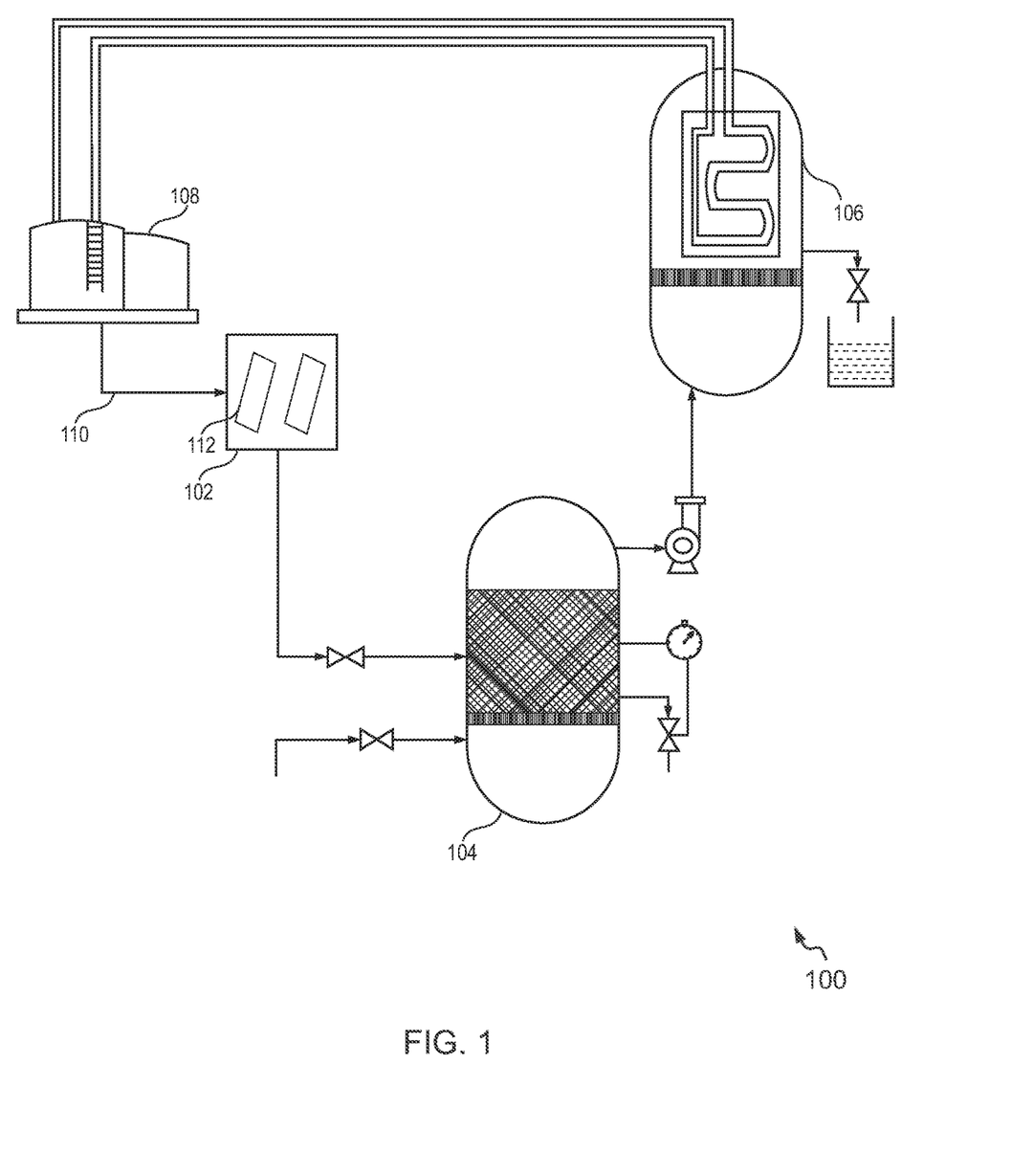
FIG. 1 is a schematic view of a system for extracting potable water from saline water, in accordance with an example embodiment of the present disclosure.

FIG. 1 in one exemplary embodiment of the present disclosure illustrates a schematic view of a system 100 for extracting potable water from saline water. The system 100 may be configured to be used as a small to medium scale desalination device, which prevents underground water contamination or loss of clean water, while being cost-effective in operation and maintenance. Although, the system 100 is preferable to be used as a small to medium scale desalination device, it may be contemplated that the system 100 may also be used as a large scale desalination device as per feasibility and requirement. The system 100 broadly includes a pre-treatment unit 102, an evaporator 104 and a condenser 106.

Figure 2:
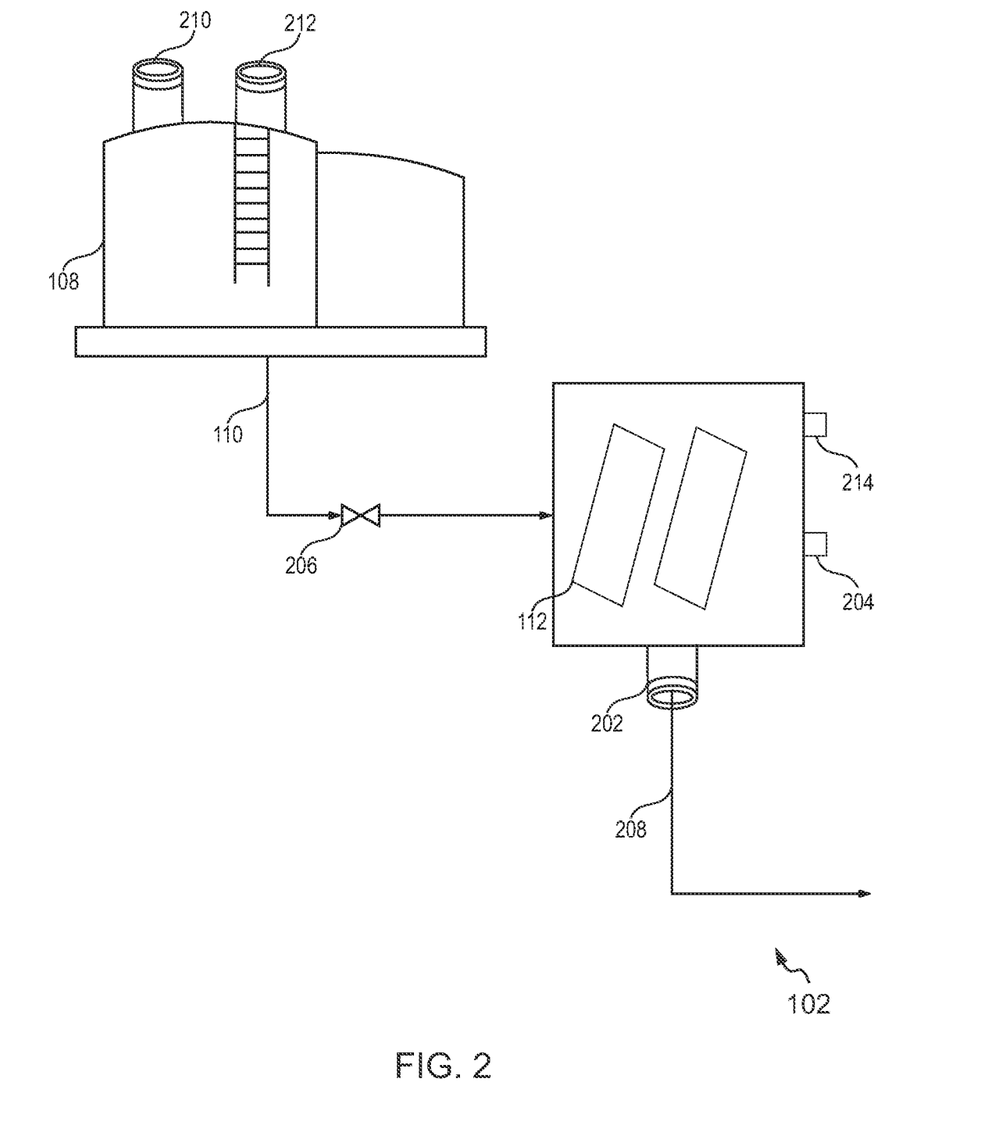
FIG. 2 is a schematic view of a pre-treatment unit of the system of FIG. 1 coupled to a reservoir, in accordance with an example embodiment of the present disclosure.
Figure 5:
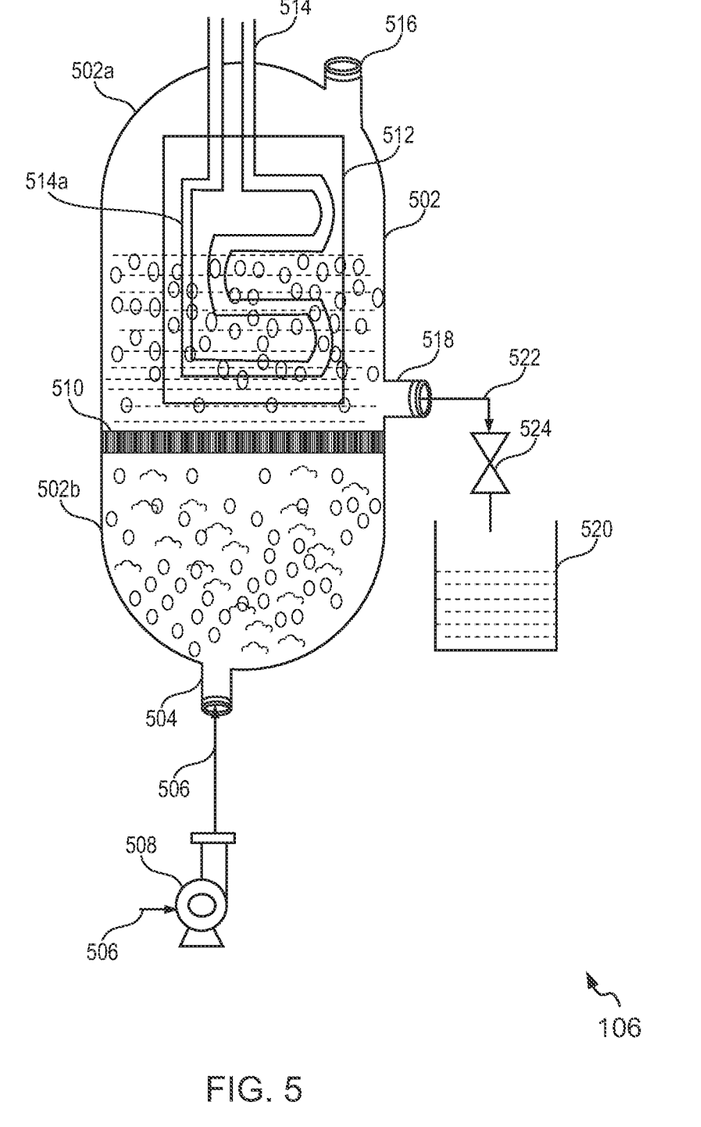
FIG. 5 is a schematic view of a condenser of the system of FIG. 1, in accordance with an example embodiment of the present disclosure.

Referring to FIG. 2 in conjunction with FIG. 1, the pre-treatment unit 102 of the system 100 is fluidically coupled to a reservoir 108. The reservoir 108 may be a tank or a water body such as a pond, a sea or an ocean or any other water body capable of supplying the saline water to the pre-treatment unit 102. The reservoir 108 may be fluidically coupled to the pre-treatment unit 102 via a conduit 110. Alternatively, the reservoir 108 may be fluidically coupled to the pre-treatment unit 102 via a channel, a duct, a pipe, a tube or any other means as per feasibility and requirement. The reservoir 108 may also include ports 210 and 212 in fluid communication with the condenser 106. The ports 210 and 212 may be configured to supply a portion of the saline water to the condenser 106 via heat exchange tubes 514 (for e.g. as shown in FIG. 5), for accelerating the condensation process occurring in the condenser 106, described later. The pre-treatment unit 102 may be a heating device, configured for heating the saline water received from the reservoir 108 to a predetermined temperature. The heating device may include a plurality of solar cells 112 configured to heat the saline water received from the reservoir 108, by utilizing sun light. The solar cells 112 work similar to the conventional solar celled boilers, for heating the saline water. The use of solar cells 112 for heating the saline water, renders the system 100 eco-friendly and cost-effective in operation. Alternatively, the heating device may be selected from one of ovens, hot plates, heating mantles, furnaces or any other devices which enables heating of the saline water as per feasibility and requirement. The pre-treatment unit 102 also includes a pre-treatment outlet port 202 configured to discharge the heated saline water from the pre-treatment unit 102.

The pre-treatment unit 102 may also include a sensor 204 for determining temperature of the saline water therein. The sensor 204 may be a thermocouple, a thermometer or any other temperature measuring unit. Further, the saline water is heated to the predetermined temperature in the pre-treatment unit 102 for formation of water molecules in the evaporator 104. The predetermined temperature of the saline water is selected such that precautions for monitoring factors such as pH of the saline water, scale formation and other factors in the pre-treatment unit 102 are minimal. The predetermined temperature of the saline water may be selected to be about 70° C. to about 100° C., based on the type of the saline water employed for extracting the potable water. In an embodiment, the predetermined temperature may be determined based on the type of the saline water used for extracting the potable water. In an embodiment, the predetermined temperature of the saline water in the pre-treatment unit 102 may be selected based on the operating temperature or configuration of the evaporator 104. In an embodiment, the predetermined temperature for seawater as the saline water is 70° C. Further, the pre-treatment unit 102 may also be employed for filtration of toxins or other chemical substances which may be present in the saline water, prior to supply to the evaporator 104.

In an embodiment, a valve 206 may be configured to the conduit 110, for controlling the supply of saline water to the pre-treatment unit 102. The valve 206 may be interfaced to a control unit (not shown in Figures). The control unit may operate the valve 206 for supplying the saline water to the pre-treatment unit 102 as per requirement. In an embodiment, the control unit operates the valve 206 based on the level of the saline water within the pre-treatment unit 102. That is, if the level of the saline water is lower than a pre-set limit, the valve 206 is operated to an open position (not shown in Figures) for allowing supply of fresh saline water into the pre-treatment unit 102. A fluid level sensor 214 may be mounted to the pre-treatment unit 102, for determining the level of the saline water therein. In an embodiment, the valve 206 may be one of a directional control valve or shut-off valve or any other valve as per feasibility and requirement.

Figure 3:
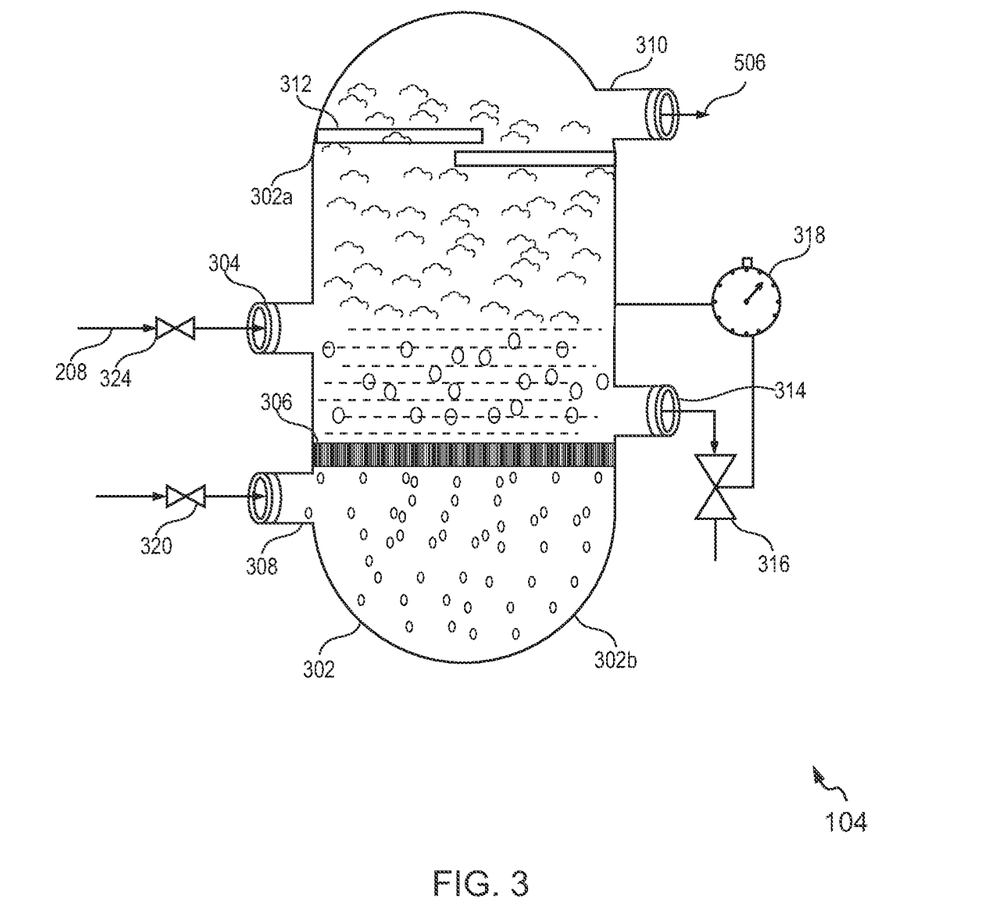
FIG. 3 is a schematic view of an evaporator of the system of FIG. 1, in accordance with another example embodiment of the present disclosure.

Referring to FIG. 3 in conjunction with FIGS. 1 and 2, the evaporator 104 of the system 100 is fluidically coupled to the pre-treatment unit 102 for receiving the heated saline water. The evaporator 104 may be fluidically coupled to the pre-treatment unit 102 via a conduit 208. Alternatively, the evaporator 104 may be fluidically coupled to the pre-treatment unit 102 via a channel, a duct, a pipe, a tube or any other means as per feasibility and requirement. A valve 324 may be configured in the conduit 208 for controlling the flow of the heated saline water into the evaporator 104. The evaporator 104 is configured for converting the heated saline water into a mixture of water molecules and the concentrated saline water.

Figure 4:
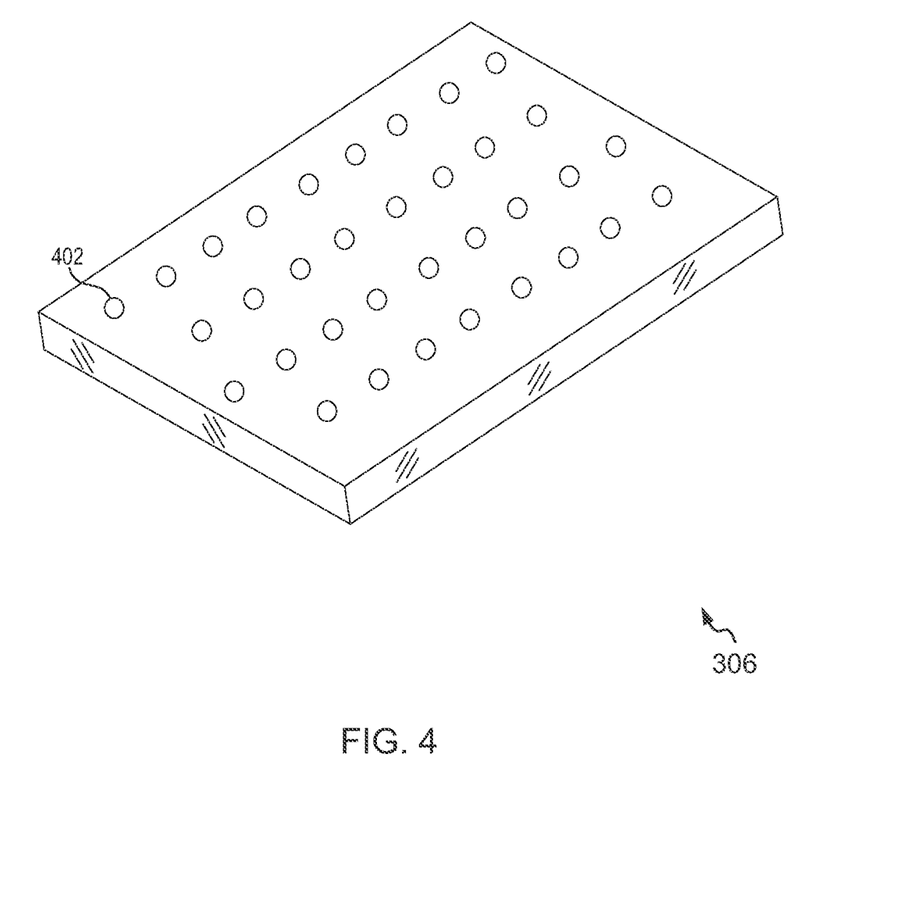
FIG. 4 is a perspective view of a porous material disposed within the evaporator of FIG. 3, in accordance with an example embodiment of the present disclosure.

The evaporator 104 includes a housing 302 having an evaporator inlet port 304 fluidically coupled to the pre-treatment outlet port 202 via the conduit 208, for receiving the heated saline water from the pre-treatment unit 102. The evaporator 104 also includes a porous material 306 (for e.g. as shown in FIG. 4) disposed at a bottom portion 302b of the housing 302. The porous material 306 is a sheet-like structure including a plurality of pores 402 (as shown in FIG. 4). The porous material 306 is configured to act as a partition layer within the housing 302. Further, an evaporator gas port 308 is configured in the housing 302 and is positioned below the porous material 306, for supplying a gas within the housing 302. This configuration of the gas port 308 ensures that the gas routed to the housing 302 passes through the porous material 306 and thereafter fills within the housing 302. The gas, when routed to the housing 302 filled with the heated saline water, disperses as gas bubbles upon passing through the porous material 306. The gas bubbles induce turbulent motion of the heated saline water within the housing 302. The turbulent motion of the heated saline water results in generation of water molecules. Further, the gas bubbles being characterized by a larger interfacial area, also aid in generation of the water molecules. The mechanism employed in the evaporator 104 for gas bubble enhanced evaporation is subsequently explained in detail. In an embodiment, the gas supplied to the housing 302 is atmospheric air. Alternatively, the gas may be one of the noble gases such as argon, neon, helium, and the like, which serves the purpose of generation of the water molecules. In an embodiment, the gas supplied to the housing 302 may be selected based on its non-reactivity with the saline water.

In an embodiment, the mechanism of gas bubble enhanced evaporation in the evaporator 104 is described herein. The boiling point of the saline or seawater, according to its thermodynamic properties, is dependent on its salt contents. Generally, the boiling point of the saline or seawater is about 110° C. and the heat of vaporization ΔH of the saline water is about 40.6 kJ/mol (or 9.71 kcal/mol). Thus, for extracting water molecules from the saline water, a minimum of 40.6 kJ/mol is required to be supplied to the evaporator 104. The rate of liquid evaporation from the saline water, upon supplying the required energy, is given by Eq. 1 as mentioned below.

$$\frac{dN}{dt} = -\frac{\Delta P A N_A}{\sqrt{2\pi MRT}} \exp(-E_{act}/RT) \qquad \text{Eq. (1)}$$

Where:
ΔP is the pressure difference between the equilibrated vapor at temperature T and the actual partial pressure of gas phase molecules,
$N_A$ is the Avogadro number,
M is the molecular weight,
R is the gas constant,
A is the interfacial area between liquid and gas phase, and
exp ($-E_{act}/RT$) is the fraction of the liquid molecules which can escape from the liquid surface with high enough kinetic energy.

Further, the heat of vaporization is a thermodynamic bulk property of the liquid, it is anticipated that escaping molecules from the surface only experience the attractive potential from the domain of the liquid phase. Thus, the activation energy $E_{act}$ in Eq. (1) can be estimated to be half the value of ΔH and is given by 20 kJ/mol for water. Additionally, in Eq. (1), there are two independent parameters which can be manipulated to enhance the evaporation rate, that is, the temperature T and the interfacial area A. ΔP in Eq. (1) is solely determined by the saline water temperature. The saline water at 70° C. is assumed for reducing the scaling rate of dissolved salts which may affect the inner periphery of the housing 302. Further, ΔP in the range of 210 Torr is assumed for the saline water at 70° C., and the ΔP value increases correspondingly at higher temperatures of the saline water. Alternatively, the contribution to the evaporation rate of saline water at a higher temperature can be easily compensated by the interfacial areas and turbulent motion or mixing induced by the air bubbles in the housing 302.

Further, from Eq. (1), the evaporation rate of the saline water at 70° C. is calculated to be 0.55 mol/min, where the interfacial area is chosen to be 200 cm² and $E_{act}$ is 20 kJ/mol. Thus, to increase the interfacial area A between the liquid (i.e. saline water) and gas phase in Eq. (1), 0.02 mol/s air is purposely introduced into the evaporator 104 and the air mass is dispersed by the porous material 306 into micron-sized bubbles. Assume that these bubbles flow through saline water within is and their diameter is 1 μm, the interfacial area between air bubbles and saline water liquid is estimated to be $1.2 \times 10^5$ cm² at any instant. In an embodiment, according to Eq. (1) the total evaporation of water into the gaseous pockets of air bubbles can be several orders of magnitude higher than those cases of evaporation from a limited interfacial area. The air bubbles also maintain a constant water vapor pressure inside the evaporator 104, which aid in generation of the water vapors. Subsequent to the turbulent motion in the housing 302 of the evaporator 104, the heated saline water is converted into a mixture of the water molecules and the concentrated saline water. In an embodiment, the concentrated saline water is a solution including concentrated salts, which remain upon evaporation of the water molecules in the saline water. In other words, the concentrated saline water is a solution including higher concentration of salts than the saline water, obtained as a result of evaporation of the water molecules from the saline water.

The housing 302 of the evaporator 104 further includes a first evaporator outlet port 310 mounted to a top portion 302a of the housing 302, for discharging the mixture of the gas and the water molecules. The first evaporator outlet port 310 is preferably positioned on the top portion 302a of the housing 302, as the mixture of the gas and the water vapors occupy the top portion 302a of the housing 302. This eases the process of discharge of the mixture of the gas and the water vapors from the housing 302. Further, a plurality of baffle plates 312 are mounted proximal to the first evaporator outlet port 310 for preventing splashing of the saline water during the turbulent mixing. In an embodiment, each of the plurality of baffle plates 312 is configured to be a plate-like structure, configured to prevent splashes of the saline water during its turbulent mixing. Each of the plurality of baffle plates 312 may be mounted on opposite sides within the housing 302, such that, a path between their ends may be provisioned. This configuration inherently prevents splashing of the saline water within the first evaporator outlet port 310 during the turbulent mixing. In an embodiment, the baffle plates 312 may form a zig-zag configuration, a cascaded configuration or any other configuration which prevents splashing of the saline water during the turbulent mixing. Additionally, the housing 302 also includes a second evaporator outlet port 314, preferably mounted on a central portion of the housing 302, for discharging the concentrated saline water from the housing 302. The second evaporator outlet port 314 may include a valve 316 coupled to the control unit, which upon actuation to open position, allows discharge of the concentrated saline water from the housing 302. The valve 316 may be coupled to a conductivity meter 318, which is configured to measure salinity of the concentrated saline water during its discharge from the housing 302. The conductivity meter 318 determines concentration of the concentrated saline water.

Referring to FIG. 5 in conjunction with FIG. 1, the condenser 106 of the system 100 is fluidly connected to the evaporator 104. The condenser 106 includes a casing 502, to which a condenser inlet port 504 is mounted at its bottom portion 502b and coupled to the first evaporator outlet port 310 for receiving the mixture of the gas and the water vapors. The condenser inlet port 504 is fluidically coupled to the first evaporator outlet port 310 via a conduit 506. The conduit 506 may include a blower 508 configured to route the mixture of the gas and the water vapor from the evaporator 104. The blower 508 may be configured with a relatively lower pressure ratio between the first evaporator outlet 310 and the condenser inlet port 504. In an embodiment, the blower 508 is configured to deliver gas flow (i.e. the mixture of the gas and the water vapors) output at 1.1 atm from the first evaporator outlet 310 into the condenser inlet port 504. In an embodiment, the blower 508 is configured to create suction in the conduit 506 for enabling gas flow from the evaporator 104 to the condenser 106. In an embodiment, the blower 508 is configured with a capacity of 40 m³/min and can transport 10 Ton pure water vapors from the evaporator 104 at 70° C., to the condenser 106.

The casing 502 also includes a sparger plate 510 disposed on the bottom portion 502b of the casing 502, so that the mixture of the gas and the water vapors pass through the sparger plate 510 prior to filling the casing 502. The sparger plate 510, similar to the porous material 306, further disperses the mixture of the gas and the water molecules. The dispersion generates gas bubbles with trapped water molecules inside. The gas bubbles along with the water molecules rise up within the casing 502. Further, due to the lower temperature of the casing 502, the water vapors in the gas bubbles condense to form liquid water, which settles down on the sparger plate 510. Thus, the potable water is extracted from the gas molecules. For enhancing the condensation process in the condenser 106, a heat exchanger 512 is mounted within the casing 502.

Figure 6:
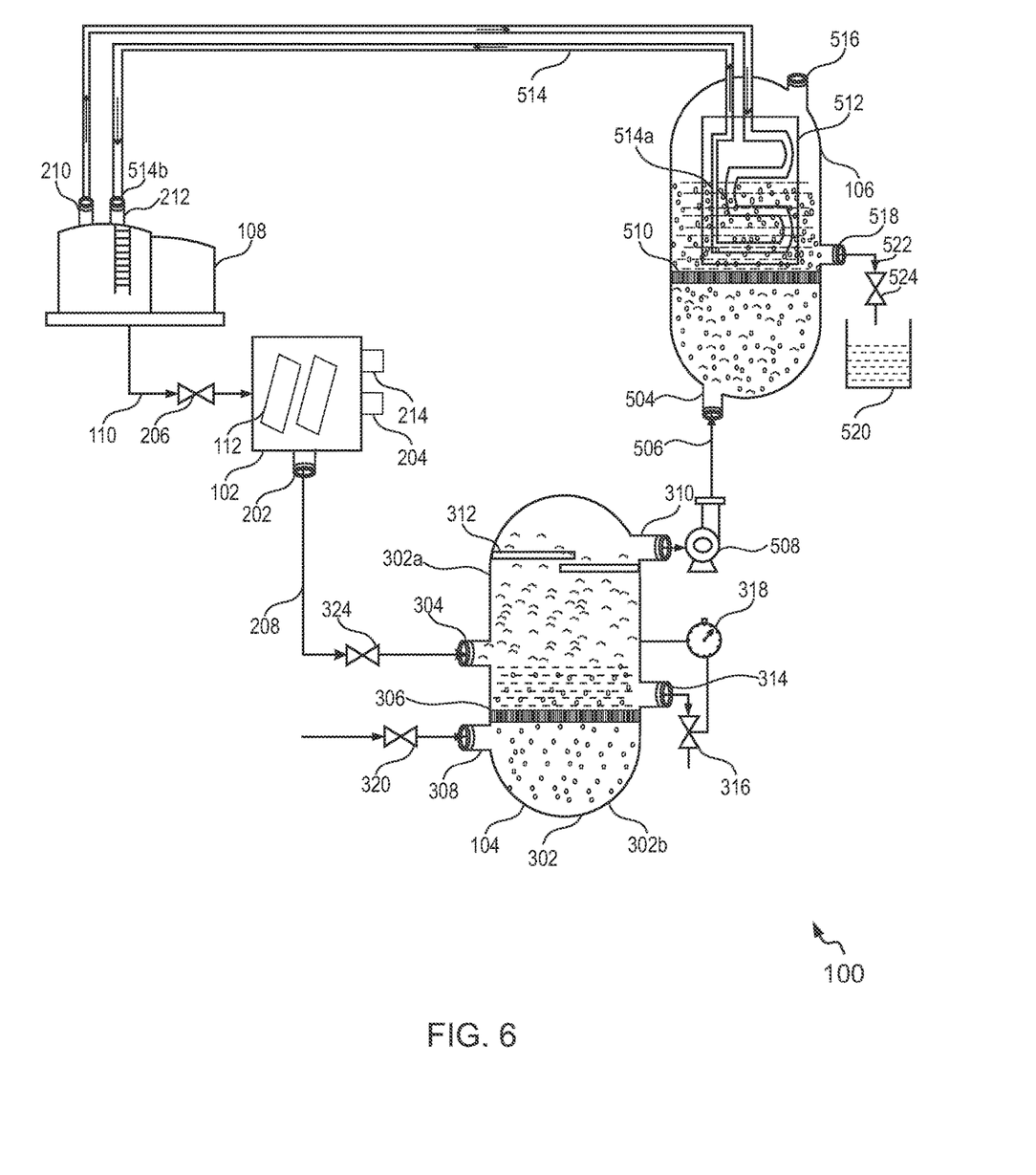
FIG. 6 is a schematic view of the system of the FIG. 1 illustrating flow of fluid molecules therein, in accordance with an example embodiment of the present disclosure.

The heat exchanger 512 is configured with heat exchange tubes 514 having one end 514a disposed proximal to the sparger plate 510 within the casing 502 and the other end 514b disposed within the pre-treatment unit 102 (for e.g. as shown in FIG. 6). This configuration ensures that the heat is extracted from the end 514a and is dumped at the reservoir 108 by the end 514b, thereby resulting in condensation in the condenser 106. The heat exchange tubes 514 are configured to receive a portion of the saline water inlet from the reservoir 108. The saline water travels from the reservoir 108 to the casing 502, extracts heat from the water vapors in the casing 502 and reverts back to the reservoir 108, where the heat is dumped. For ensuring that a larger quantity of saline water is in contact with the water vapors, the end 514a of the heat exchange tubes 514 are corrugated and positioned proximal to the sparger plate 510, thereby enhancing condensation. In an embodiment, the portion of the saline water may be pumped into the heat exchange tubes 514 via a pump (not shown in Figures) mounted either to the reservoir 108 or to the casing 502 as per design feasibility and requirement. Further, the heat exchange tubes 514 may be made of titanium material due to its higher thermal conductivity characteristic, and thereby aid in accelerating the condensation process in the condenser 106. In an embodiment, the casing 502 may be filled with potable water for enhancing the rate of condensation of the water molecules within the casing 502. This is due to higher heat exchange rate between the water molecules in the gas bubbles and the potable water, than that of the heat exchange rate between the water molecules and the heat exchanger 512. Thus, the potable water stored within the casing 502, condenses the water molecules.

A first condenser outlet 516 is positioned on the top portion 502a of the casing 502 for ease of discharging the gas to the surroundings, as the gas being less dense, floats in the top portion 502a of the casing 502. The casing 502 further includes a second condenser outlet 518 mounted to a central portion of the casing 502. The second condenser outlet 518 is configured to discharge the potable water condensed on the sparger plate 510. The second condenser outlet 518 is coupled to a collector 520, for discharging the potable water from the condenser 106 to the collector 520. The second condenser outlet 518 may be coupled to the collector 520 via a conduit 522 including a valve 524. The conduit 522 is configured to direct the potable water from the condenser 106 to the collector 520. The valve 524 being coupled to the control unit is operated suitably, for controlling the rate of discharge of the potable water from the condenser 106 to the collector 520.

In an embodiment, the size and configuration of the conduits 110, 208, 506, 522 are selected based on the flow rate or the discharge rate desired. In an embodiment, the conduits 110, 208, 506, 522 may be selected as a single joint configuration, to prevent flow losses associated with multiple joints.

In an embodiment, the housing 302, the casing 502, each of the plurality of baffle plates 312 and the porous material 306 are made of titanium material, due to its inherent anti-corrosive properties, thermal conductivity and high strength to weight ratio. Alternatively, the evaporator 104, the condenser 106, each of the plurality of baffle plates 312 and the porous material 306 can be made of other materials as per feasibility and requirement. In an embodiment, the porous material 306 is made of stainless steel grade-316.

In an embodiment, the casing 502 may include only the heat exchange tubes 514 without the heat exchanger 512, as per design feasibility and requirement.

In an embodiment, a gas cylinder (for e.g. as shown in FIG. 6) may be coupled to the gas port 308, for routing the gas into the housing 302. The routing of the gas into the housing 302 may be controlled by a valve 320 interfaced to the control unit.

Figure 7:
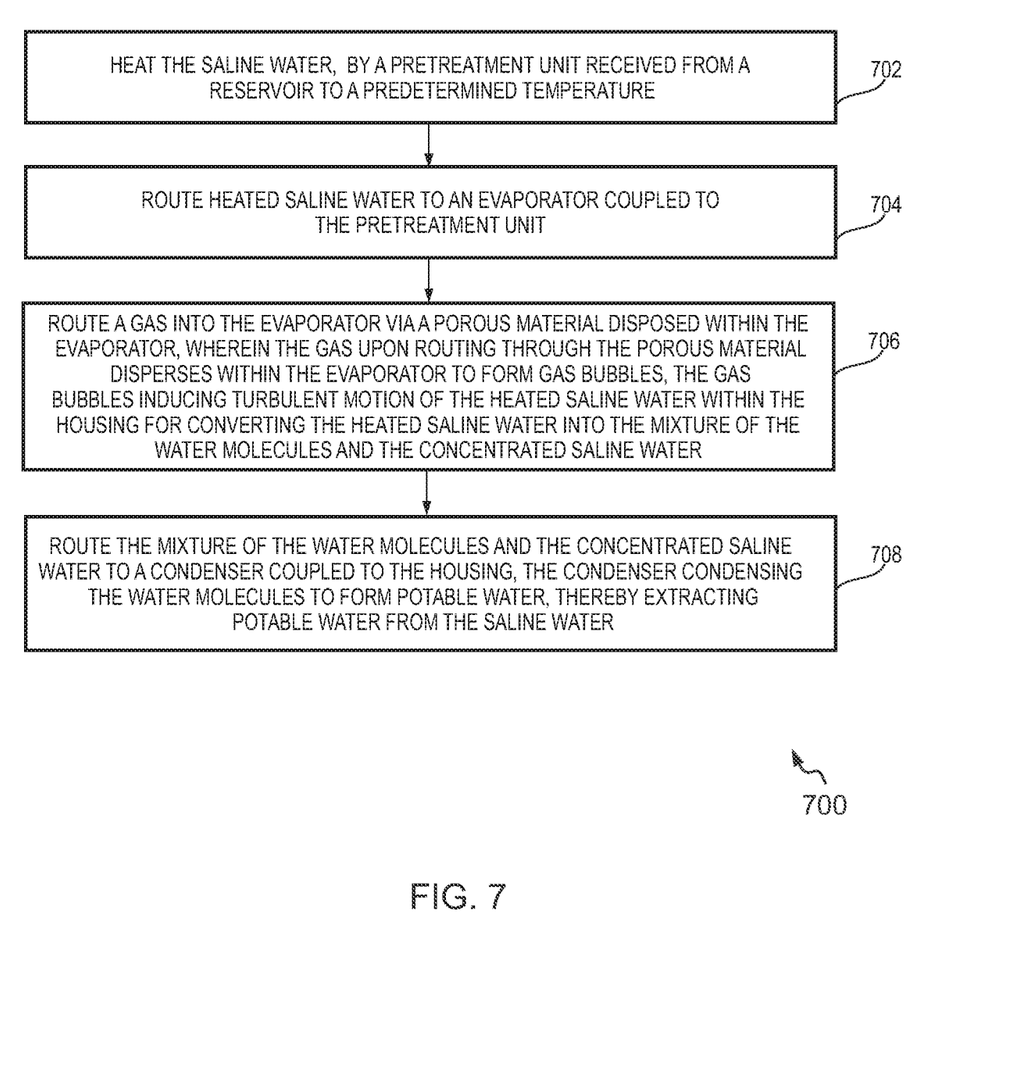
FIG. 7 is a flow diagram illustrating a method for extracting the potable water from the saline water, in accordance with an example embodiment of the present disclosure.

FIG. 7 in one exemplary embodiment of the present disclosure illustrates a flow diagram of a method for extracting the potable water from the saline water.

At step 702, the saline water is inlet into the pre-treatment unit 102 for heating the saline water to the predetermined temperature i.e. about 70° C. to about 100° C. The saline water is heated to the predetermined temperature via the solar cells 112 or any other heating device as per requirement. In an embodiment, the valve 206 is actuated by the control unit, for controlling the inlet of saline water into the pre-treatment unit 102. The control unit may monitor the readings received from the level sensor 214 for determining the level of the saline water within the pre-treatment unit 102 and thereafter operate the valve 206 suitably for filling the pre-treatment unit 102.

At step 704, the heated saline water is routed to the evaporator 104 from the pre-treatment unit 102 via the pre-treatment outlet port 202. The heated saline water is discharged from the pre-treatment unit 102 only when the temperature of the saline water reaches the predetermined temperature. The sensor 204 monitors the temperature of the saline water during the heating process in the pre-treatment unit 102. Upon reaching the predetermined temperature, the sensor 204 notifies the control unit, which operates the valve 324 for discharging the heated saline water to the evaporator 104.

At step 706, the gas is routed into the housing 302 of the evaporator 104 via the gas port 308. The gas may be sucked into the housing 302 (due to the suction induced by the blower 508) or may be pumped into the housing 302. The gas upon entering the bottom portion 302b of the housing 302 enters the porous material 306. While exiting the porous material 306, the gas disperses into gas bubbles, which induces turbulent motion within the housing 302. Consequently, the saline water is converted into the mixture of the gas, the water molecules and the concentrated saline water. In this scenario, the concentrated saline water may be drained from the housing 302 as already described.

At step 708, the mixture of the gas and the water vapors remaining in the housing 302 is discharged into the condenser 106 via the blower 508, while retaining the concentrated saline water in the evaporator 104. The mixture of the gas and the water vapors enter the casing 502 of the condenser 106 via the condenser inlet port 504 positioned at its bottom portion 502b. Subsequently, the mixture is routed through the sparger plate 510, which also disperses the mixture to generate air bubbles with trapped water molecules inside. Upon dispersion, the mixture of the gas molecules and the water molecules rise within the casing 502. The water molecules thereupon condense steadily due to the lower temperature conditions of the casing 502, thereby extracting potable water from the mixture. For accelerating the condensation process, the heat exchanger 512 is positioned within the casing 502 and proximal to the sparger plate 510. The heat exchanger 512 includes the heat exchange tubes 514, which receives the portion of the saline water from the reservoir 108. The portion of the saline water traverses the contour of the heat exchange tubes 514 and extracts heat from the water vapors. By its efficient heat transfer rate, the water molecules condense to form the potable water. The heat from the casing 502 is thus transferred to the reservoir 108.

The benefits and advantages described above may relate to one embodiment or may relate to several embodiments. The embodiments are not limited to those that solve any or all of the stated problems or those that have any or all of the stated benefits and advantages.

The above description is given by way of example only and various modifications may be made by those skilled in the art. The above specification, examples and data provide a complete description of the structure and use of exemplary embodiments. Although various embodiments have been described above with a certain degree of particularity, or with reference to one or more individual embodiments, those skilled in the art could make numerous alterations to the disclosed embodiments without departing from the spirit or scope of this specification.

What is claimed is:

1. A system for extracting potable water from saline water, the system comprising:
a pre-treatment unit configured to receive the saline water from a reservoir, the pre-treatment unit configured to heat the saline water to a predetermined temperature;
an evaporator fluidically coupled to the pre-treatment unit for receiving the heated saline water,
the evaporator comprising:
a housing fluidically coupled to the pre-treatment unit for receiving the heated saline water,
a porous material disposed at a bottom portion of the housing,
an evaporator gas port mounted to the housing and positioned below the porous material, the evaporator gas port routing gas into the housing through the porous material, wherein the gas, upon routing through the porous material, disperses within the housing to form gas bubbles, the gas bubbles characterized by large interfacial areas and inducing turbulent motion of the heated saline water within the housing for converting the heated saline water into a mixture of gas, water vapors and concentrated saline water,
a first evaporator outlet port mounted to a top portion of the housing for discharging the mixture of the gas and the water vapors from the housing, and
a plurality of baffle plates mounted proximal to the first evaporator outlet port for preventing splashing of the heated saline water into the first evaporator outlet port during the turbulent motion within the housing, wherein the plurality of baffle plates are mounted on opposite sides within the housing, such that a path between ends of the plurality of baffle plates is provisioned;
a conduit to fluidically couple the housing of the evaporator and a condenser, wherein the conduit comprises a blower configured to route the mixture of the gas and the water vapors from the evaporator; and
the condenser fluidically coupled to the housing of the evaporator for receiving the mixture of the gas and the water vapors, the condenser condensing the water vapors to form potable water, thereby extracting potable water from the saline water.

2. The system as claimed in claim 1, further comprising a pre-treatment inlet port configured to the pre-treatment unit and coupled to the reservoir for receiving the saline water.

3. The system as claimed in claim 1, wherein the pre-treatment unit includes a plurality of solar cells configured for heating the saline water to the predetermined temperature.

4. The system as claimed in claim 1, wherein the predetermined temperature at which the pre-treatment unit heats the saline water is in the range of about 70° C. to about 100° C.

5. The system as claimed in claim 1, further comprising a pre-treatment outlet port configured on the pre-treatment unit for discharging the heated saline water.

6. The system as claimed in claim 5, wherein the pre-treatment outlet port is coupled to an evaporator inlet port, configured on the housing, for discharging the heated saline water into the housing.

7. The system as claimed in claim 1, wherein the porous material is a perforated sheet-like structure extending along an inner periphery of the housing.

8. The system as claimed in claim 1, further comprising a second evaporator outlet port mounted on a central portion of the housing, the second evaporator outlet port discharging the concentrated saline water from the housing.

9. The system as claimed in claim 1, further comprising a condenser inlet port positioned at a bottom portion of a casing of the condenser, and coupled to the first evaporator outlet port, for receiving the mixture of the gas and the water vapors from the housing.

10. The system as claimed in claim 9, further comprising a sparger plate mounted proximal to the condenser inlet port, the sparger plate being configured to induce gas bubbles of the water vapors, when the mixture of the gas and the water vapors are routed through the sparger plate of the condenser inlet port.

11. The system as claimed in claim 9, further comprising a heat exchanger disposed within the casing for condensing the water vapors in the gas bubbles entering the casing to form the potable water, the heat exchanger comprising heat exchange tubes including one end disposed within the casing and the other end disposed within the reservoir for receiving a portion of the saline water, wherein the portion of the saline water upon routing within the heat exchange tubes is configured to extract heat from the water vapors and transfer the heat to the reservoir.

12. The system as claimed in claim 1, further comprising a first condenser outlet port positioned at a top portion of the condenser for discharging the gas from the condenser.

13. The system as claimed in claim 1, further comprising a second condenser outlet port mounted to the condenser and coupled to a collector, for discharging the potable water from the condenser to the collector.

14. An evaporator comprising:
a housing configured for receiving heated saline water, the heated saline water being heated to a predetermined temperature;
a porous material disposed at a bottom portion of the housing; and
an evaporator gas port mounted to the housing and positioned below the porous material, the evaporator gas port routing gas into the housing through the porous material, wherein the gas, upon routing through the porous material, disperses within the housing to form gas bubbles, the gas bubbles characterized by large interfacial areas and inducing turbulent motion of the heated saline water within the housing for converting the heated saline water into the mixture of gas, water vapors and concentrated saline water, a first evaporator outlet port mounted to a top portion of the housing for discharging the mixture of the gas and the water vapors from the housing, and a plurality of baffle plates mounted proximal to the first evaporator outlet port for preventing splashing of the heated saline water into the first evaporator outlet port during the turbulent motion within the housing, wherein the plurality of baffle plates are mounted on opposite sides within the housing, such that a path between ends of the plurality of baffle plates is provisioned.

15. A method for extracting potable water from saline water, comprising:

heating by a pre-treatment unit, the saline water received from a reservoir to a predetermined temperature;

routing the heated saline water to an evaporator comprising a housing coupled to the pre-treatment unit;

routing a gas into the evaporator through a porous material disposed within the evaporator, wherein the gas upon routing through the porous material disperses within the evaporator to form gas bubbles, the gas bubbles characterized by large interfacial areas and inducing turbulent motion of the heated saline water within the housing for converting the heated saline water into a mixture of gas, water vapors and concentrated saline water, the evaporator comprising a first evaporator outlet port mounted to a top portion of the housing for discharging the mixture of the gas and the water vapors from the housing and a plurality of baffle plates mounted proximal to the first evaporator outlet port for preventing splashing of the heated saline water into the first evaporator outlet port during the turbulent motion within the housing, wherein the plurality of baffle plates are mounted on opposite sides within the housing, such that a path between ends of the plurality of baffle plates is provisioned; and routing the mixture of the gas and the water vapors to a condenser coupled to the housing, the condenser condensing the water vapors to form potable water, thereby extracting potable water from the saline water; wherein the mixture of the gas and the water vapors is routed to the condenser via a conduit comprising a blower configured to route the mixture of the gas and the water vapors from the evaporator.

16. The method as claimed in claim 15, wherein the predetermined temperature at which the pre-treatment unit heats the saline water is about 70° C. to about 100° C.

17. The method as claimed in claim 15, further comprising, routing a portion of the saline water through heat exchange tubes, the heat exchange tubes including one end disposed within the condenser and another end disposed within the reservoir, the heat exchange tubes configured to extract heat from the water vapors and transfer the heat to the reservoir for heating.

* * * * *